US008732855B2

(12) United States Patent  
Thomas et al.

(10) Patent No.: US 8,732,855 B2  
(45) Date of Patent: May 20, 2014

(54) LAUNCHING A CACHED WEB APPLICATION BASED ON AUTHENTICATION STATUS

(75) Inventors: Neil Richard Thomas, Richmond (CA); Alex Kennberg, Waterloo (CA); Brett R. Lider, San Francisco, CA (US); Punit Soni, San Francisco, CA (US)

(73) Assignee: Google Inc., Mountain View, CA (US)

( * ) Notice: Subject to any disclaimer, the term of this patent is extended or adjusted under 35 U.S.C. 154(b) by 622 days.

(21) Appl. No.: 12/895,182

(22) Filed: Sep. 30, 2010

(65) Prior Publication Data

US 2012/0084833 A1    Apr. 5, 2012

(51) Int. Cl.
*H04L 29/06* (2006.01)
*G06F 21/44* (2013.01)
*G06F 21/12* (2013.01)
*G06F 17/30* (2006.01)

(52) U.S. Cl.
CPC ............ *G06F 21/44* (2013.01); *G06F 21/128* (2013.01); *G06F 17/30902* (2013.01)
USPC ........................................... 726/29; 715/745

(58) Field of Classification Search
CPC .. G06F 21/44; G06F 21/128; G06F 21/30902
USPC ............................................. 726/29; 715/745
See application file for complete search history.

(56) References Cited

U.S. PATENT DOCUMENTS

| | | | |
|---|---|---|---|
| 6,374,359 B1 | 4/2002 | Shrader et al. | |
| 6,424,981 B1 | 7/2002 | Isaac et al. | |
| 6,430,570 B1 | 8/2002 | Judge et al. | |
| 2004/0128347 A1 | 7/2004 | Mason et al. | |
| 2004/0168083 A1 | 8/2004 | Gasparini et al. | |
| 2006/0021004 A1* | 1/2006 | Moran et al. | ........................ 726/2 |
| 2007/0033155 A1 | 2/2007 | Landsman | |
| 2007/0033588 A1* | 2/2007 | Landsman | ........................ 717/178 |
| 2010/0083361 A1* | 4/2010 | Fleming et al. | ........................ 726/8 |
| 2012/0036264 A1 | 2/2012 | Jiang et al. | |

OTHER PUBLICATIONS

Cymerman, Michael. "Secure a Web Application, Java-style." Java World: Solutions for Java Developers; Apr. 28, 2000 [Retrieved on Sep. 24, 2010] Retrieved from the Internet <URL: http://www.javaworld.com/javaworld/jw-04-2000/jw-0428-websecurity.html> (9 pages).

(Continued)

*Primary Examiner* — Jeffrey D Popham  
(74) *Attorney, Agent, or Firm* — Fish & Richardson P.C.

(57) ABSTRACT

In general, the subject matter described in this specification can be embodied in methods, systems, and program products for receiving a request to retrieve electronic resources that correspond to a first network address. The resources are retrieved from a cache. The retrieved resources are responsive to the received request, correspond to the first network address, and are configured to activate a first web application. Activation of the first web application requires that the computing device be authenticated. Instructions that are in the retrieved resources and are for activating the first web application are executed. The execution includes determining that the computing device is not authenticated to activate the first web application, and requesting to retrieve electronic resources that correspond to a second network address and that are configured to activate a second web application. Activation of the second web application does not require that the computing device be currently authenticated.

17 Claims, 12 Drawing Sheets

(56) References Cited

OTHER PUBLICATIONS

Dhandhania, Arpan. "HTML 5: Offline Application Caching." Web Reference: Dev. the Web [Retrieved on Sep. 24, 2010] Retrieved from the Internet <URL: http:www.webreference.com/authoring/languages/html/HTML5-Application-Caching/> (4 pages).

Nottingham, Mark. "Caching Tutorial for Web Authors and Webmasters." Jun. 29, 2010 [Retrieved on Sep. 9, 2010] Retrieved from the Internet <URL: http://www.mnot.net/cache_docs/#Control> (10 pages).

Authorized Officer E. Sogno-Pabis. International Search Report and Written Opinion of the International Searching Authority in international application No. PCT/US2011/051028, mailed Nov. 17, 2011, 14 pages.

International Preliminary Report on Patentability in International Application No. PCT/US2011/051028, issued Apr. 2, 2013, 6 pages.

\* cited by examiner

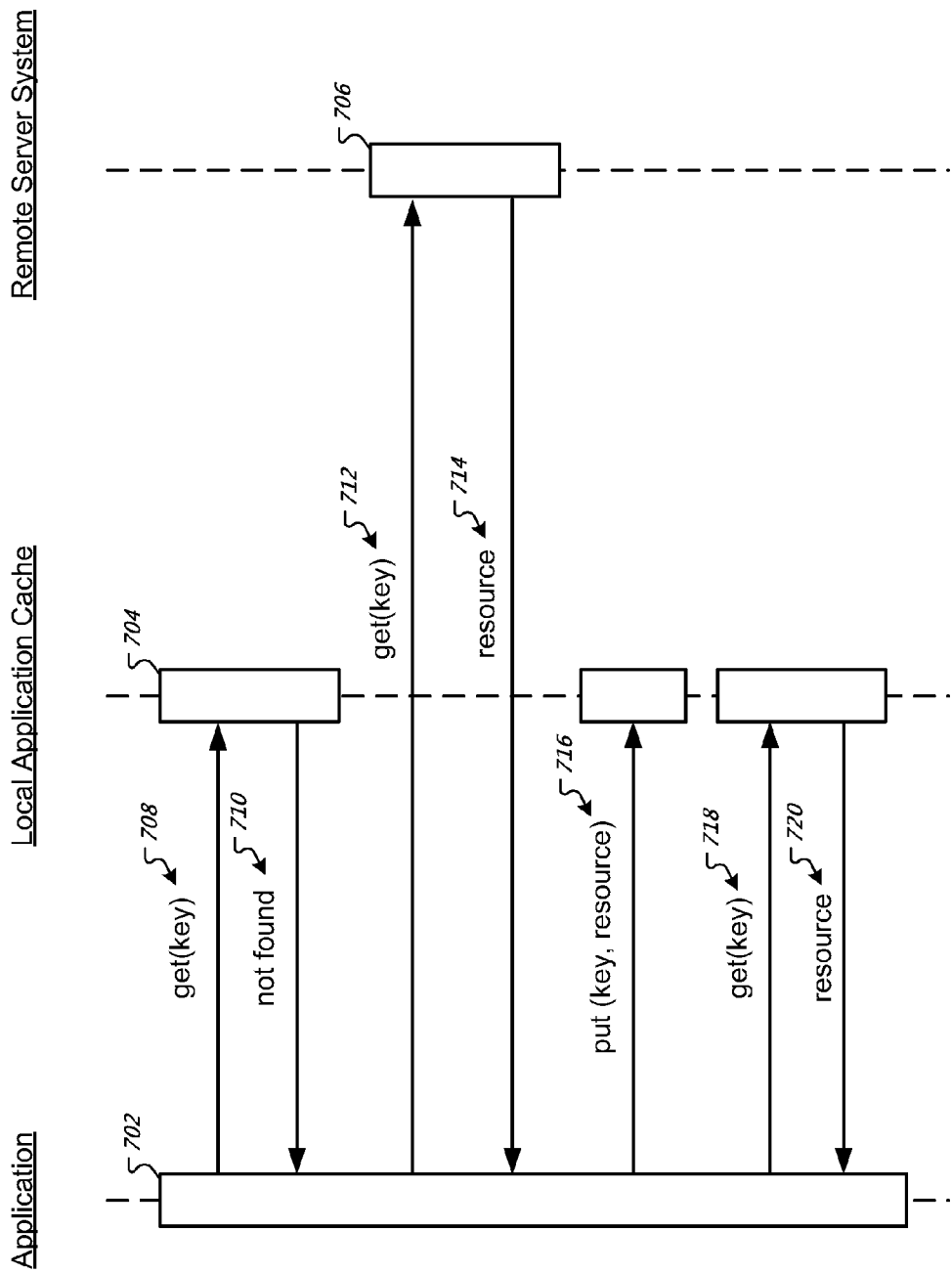

LAUNCHING A CACHED WEB APPLICATION BASED ON AUTHENTICATION STATUS

TECHNICAL FIELD

This document generally describes techniques, methods, systems, and mechanisms for launching a cached web application based on an authentication status.

BACKGROUND

The present disclosure generally relates to accessing web applications. As the internet has become more widely accessible and data connection speeds have increased, more and more applications that historically executed solely on personal computing devices have begun to be provided on-demand to the computing devices by networked server systems. For example, internet-based email and word processing applications are commonly accessed using a web browser or web-based applications in lieu of installing the application programs on a computing device and storing the relevant word processing data files locally to be accessed by the applications. Internet connectivity, however, is not always available, may be slow, and may be expensive.

SUMMARY

This document describes techniques, methods, systems, and mechanisms for launching a cached webpage based on an authentication status. In general, a user of a computing device may visit both authenticated and unauthenticated versions of a webpage, and the computing device may store both versions in a local cache. For example, a newspaper web site may deliver one type of content if a user is unauthenticated (e.g., not logged into the site), and may deliver different content (e.g., personalized pages) when the user is authenticated (e.g., logged in). Both forms of content may be cached to the user's device so that the content can be accessed if the user's network connection is interrupted, such as by the user getting on an airplane or leaving a network coverage area (e.g., all the sports stories at a newspaper may be cached if a user visits a single sports story).

At a later point in time, the user may request to view a URL that corresponds to one of the authenticated or unauthenticated versions of the webpage. The computing device may retrieve from the cache resources that correspond to the requested URL. A web browser may execute the resources and instructions stored therein, where the instructions cause the web browser to check whether the computing device is correctly authenticated to render a webpage that corresponds to the requested URL (e.g., by determining whether the computing device has a cookie locally-stored that indicates that the computing device is authenticated to view the webpage).

If the computing device is correctly authenticated to view the webpage, the webpage is rendered and presented for display to the user. If the computing device is not properly authenticated, the instructions in the resources cause the web application to redirect to request resources for a URL that corresponds to a website for the correct authentication status. Thus, a cache may include a set of resources for both an authenticated and an unauthenticated version of a webpage, and each set of resources may includes instructions for determining that the mobile computing device is in the proper authentication state to view the corresponding version of the website. If the computing device is not in the proper authentication state, the computing device may be redirected to a URL for a webpage that corresponds to the computing device's current authentication state. The determination of the authentication state and the loading of resources from the cache may be performed when a network connection is unavailable.

In general, one aspect of the subject matter described in this specification can be embodied in a computer-implemented method. The method includes receiving, at a computing device, a request to retrieve electronic resources that correspond to a first network address. The method includes retrieving, from a cache that is stored locally at the computing device, resources that (i) are responsive to the received request, (ii) correspond to the first network address, and (iii) are configured to activate a first web application that is for interacting with a user. Activation of the first web application requires that the computing device be currently authenticated. The method includes executing, by the computing device, instructions that are in the retrieved resources and that are for activating the first web application. Execution of the instructions includes determining that the computing device is not currently authenticated to activate the first web application. Execution of the instructions includes requesting to retrieve electronic resources that correspond to a second network address and that are configured to activate a second web application for interacting with the user. Activation of the second web application does not require that the computing device be currently authenticated.

Another aspect of the subject matter described in this specification can be embodied in a computer-implemented method. The method includes receiving, at a computing device, a request to retrieve electronic resources that correspond to a first network address. The method includes retrieving, from a cache that is stored locally at the computing device, resources that (i) are responsive to the received request, (ii) correspond to the first network address, and (iii) are configured to activate a first web application that is for interacting with a user. Activation of the first web application requires that the computing device be currently unauthenticated. The method includes executing, by the computing device, instructions that are in the retrieved resources and that are for activating the first web application. Execution of the instructions includes determining that the computing device is currently authenticated for the first web application. Execution of the instructions includes requesting to retrieve electronic resources that correspond to a second network address and that are configured to activate a second web application for interacting with the user. Activation of the second web application requires that the computing device be currently authenticated.

In yet another aspect, the subject matter described in this specification can be embodied in a computer-implemented system. The system includes a cache on a computing device that stores a first set of resources that correspond to a first Uniform Resource Locator (URL) and a second set of resources that correspond to a second URL. The first and second sets of resources are obtained from remote computing devices over a network in response to respective requests to access resources that correspond to the first and second URLs. The system includes a web browser application program. The web browser application program is configured to receive user input that initiates a request for resources that correspond to the first URL. The web browser application program is configured to load from the cache the first set of resources that correspond to the first URL. The web browser application program is configured to execute instructions obtained from within the first set of resources and that influence the operation of the web browser application program. The system includes means for determining, by executing the instructions obtained from the first set of resources, that the computing device does not presently have a correct authentication status for activating the first set of resources, and for loading from the cache the second set of resources that correspond to both the second URL and a present authentication status.

Additional aspects can optionally include one or more of the following features. The first network address may include a first uniform resource locator (URL) for accessing resources over a network of distinct computing devices. The second network address may include a second URL for accessing resources over the network. The method may include receiving, at the computing device, user input that initiates the request to receive electronic resources that correspond to the first network address. The user input may be either user typing of the first URL or user selection of a link that is addressed to the first URL. The instructions that are in the retrieved resources may be described in a scripting language that can control execution of a web browser application program. A web browser application program may perform the receiving, retrieving, and executing steps.

The method may include submitting, by the computing device and over a network, a first request to retrieve electronic resources that correspond to the first network address. The method may include receiving, at the computing device and from a different computing device communicating over the network, the resources that correspond to the first network address. The method may include storing, in the cache, the resources that correspond to the first network address. The first request may be submitted and the resources may be stored in the cache prior to receiving the request to retrieve electronic resources. Requesting to retrieve electronic resources that correspond to the second network address may include issuing, by the computing device, a redirection request that is directed to the second network address. The method may include receiving, by the computing device, the issued redirection request, and in response, retrieving, by the computing device and from the cache, resources that correspond to the second network address and that are configured to activate the second web application.

During the receiving, retrieving and executing steps, the computing device may not be operationally connected to a network, so that the computing device may be unable to communicate with remote computing devices. During the receiving, retrieving and executing steps, the computing device may not be operationally connected to a network, so that the computing device may be unable to receive from over the network resources that correspond to the first and second network address, respectively. Determining that the computing device is not currently authenticated to activate the first web application may include determining that the computing device does not have a locally-stored cookie that indicates that the computing device is currently authenticated to activate the first web application.

Requesting to retrieve electronic resources that are stored for the second network address may include identifying the second network address within the instructions that are in the retrieved resources that correspond to the first network address. The second web application may be an unauthenticated version of the first web application that is hosted by a same domain that hosts the first web application. The requesting to retrieve electronic resources that correspond to the second network address may be performed in lieu of activating the first web application for interacting with the user by presenting for display to the user a graphical user interface that is defined by the first web application and that is configured to receive user input.

Determining that the computing device is currently authenticated for the first web application may include determining that the computing device does have a locally-stored cookie that indicates that the computing device is currently authenticated to activate the second web application. The method may include retrieving, by the computing device and from the cache, resources that correspond to the second network address. The method may include executing, by the computing device, second instructions that are in the resources that correspond to the second network address. Execution of the second instructions may include determining that the computing device is currently authenticated to activate the second web application. Execution of the second instructions may include generating a graphical user interface for the second web application. The method may include receiving user input from user interaction with the graphical user interface for the second web application. The correct authentication status for accessing the first set of resources may be an unauthenticated status. The present authentication status may be an authenticated status.

Particular embodiments can be implemented, in certain instances, to realize one or more of the following advantages. Web applications that have both authenticated and non-authenticated versions may be cached. The cached web applications may include mechanisms that ensure that the cached resources for the authenticated version are not viewed when the computing device is not authenticated, and vice versa. Individuals may be more likely to use web applications because the web applications may be faster when they access local content than content accessed over a network, and personalized information stored for an authenticated version of the web application may be more secure and not presented on the computing device when the user is no longer authenticated.

The details of one or more embodiments are set forth in the accompanying drawings and the description below. Other features, objects, and advantages will be apparent from the description and drawings, and from the claims.

DESCRIPTION OF DRAWINGS

FIG. 7 is a swim lane diagram illustrating a process for utilizing a local application cache in connection with a remote server system.

Like reference symbols in the various drawings indicate like elements.

DETAILED DESCRIPTION

Figure 1:
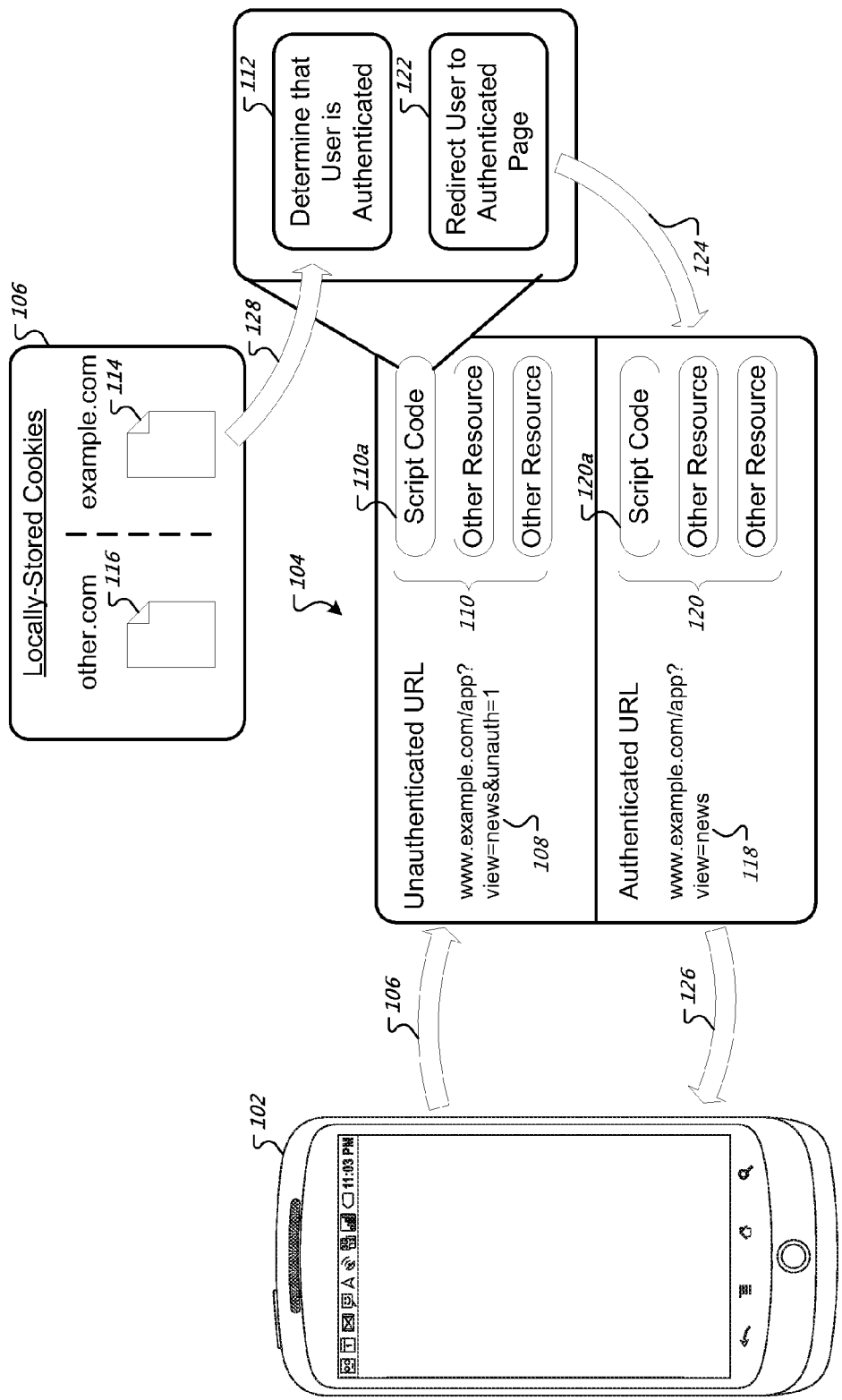
FIG. 1 is a conceptual diagram illustrating the launching of a cached web application based on an authentication status.

This document generally describes launching a cached web application based on an authentication status of a computing device. Internet web sites have increasingly provided personalized information for users that establish personal accounts for the websites. For example, search results may be tailored to a particular user based on his location and history of browsing, a news aggregation webpage may present news articles that have been selected for the user based on his prior selection of news articles, and a webpage may order content based on the user's preferences.

Many webpages that deliver personalized content may not require that all users identify themselves or otherwise "login" to access the site. Instead, a "public" version of the site may be presented if the user does not login, or has not previously logged in. For example, a user may view news articles on a news aggregation webpage, even though the user has not set up a user account for the news aggregation website. The user may be able to view a news aggregation webpage, but the webpage may not include content that is tailored to a user account. When the user is logged in, or authenticated, the user may be shown personalized content, may be allowed to comment on news articles, or may be provided with other similar additional functionality.

Thus, a webpage may have personalized and non-personalized versions for serving similar content to a user based on whether or not the user is logged into the webpage (e.g., whether the user is authenticated for the webpage or a domain of the webpage). The personalized version of the webpage may be presented if the user is presently authenticated and the non-personalized version of the webpage may be presented is the user is not presently authenticated.

Each version of the webpage may be generated based on resources that were provided in response to requests to different network addresses. In other words, a user may view the personalized webpage by requesting content that corresponds to a first URL, and the user may view the non-personalized webpage by requesting content that corresponds to a second URL. The resources used to render the webpage may be cached on the user's local computing device so that the user can access the webpage when the user is "offline," or a connection to the internet is otherwise disrupted.

When offline, the user may type a network address (or select a bookmark) for the personalized site into a web browser. Should the user not be authenticated to view the personalized page, a mechanism to redirect the computing device to load the cached version of the non-personalized page is provided by instructions in the resources for the personalized page. Similarly, should a user enter a network address for a non-personalized page when the user is authenticated, a mechanism to load the cached version of the personalized page is provided in the resources for the non-personalized site. Thus, a personalized and non-personalized webpage may work in unison to ensure that a user requesting resources for one of the pages is directed to the page corresponding to the current authentication status for the user.

As an illustration, suppose that Bill has arrived home from work, and is interested in viewing the latest news stories. Bill pulls out his mobile telephone and launches a web browser application program. Bill types in the URL www.example.com to access a webpage that aggregates popular news articles and displays abstracts for each of the news articles. Bill selects a "Go" button, and a request for resources to display the webpage is routed over the internet to a server system the provides content that corresponds to the URL www.example.com. The server system for the news aggregation webpage determines that Bill is not presently "logged in" to a user account for the news aggregation webpage, and issues a redirect to a URL that serves resources for a non-authenticated version of the news webpage (e.g., www.example.com/app?view=news&unauth=1).

The server system for the news aggregation webpage receives a request to provide resources that correspond to the URL for the non-personalized version of the news webpage (i.e., www.example.com/app?view=news&unauth=1). The server system transmits a set of resources (e.g., an html file, a JavaScript file, a css file, and a set of images) over the internet to Bill's computing device. Bill's computing device stores the received resources in a cache and at the key www.example.com/app?view=news&unauth=1, and renders a webpage based on the resources.

In various examples, the webpage is considered a "web application" because the webpage has an authenticated version that is personalized for individual visitors and an unauthenticated version that is not personalized for individual visitors. Other example characteristics of web applications include: (i) having resources for rendering and displaying a webpage with executable script instructions (e.g., JavaScript code), (ii) having a client component that is downloaded to the computing device each session or that was downloaded in a session and that remains on the computing device between sessions, and (iii) having functionality that allows a visitor to permanently create, manipulate and store data for reoccurring display on the webpage with each sessions.

Bill sees the webpage appear on his mobile telephone, and selects a "bookmark" button so that he does not need to type the URL of the website repeatedly. A bookmark is created that links to the URL for the non-authenticated version of the webpage (i.e., www.example.com/app?view=news&unauth=1). After browsing the news articles for awhile, Bill notes that many of the articles are about global issues, but he does not see many articles that are specific to his hometown, or that pertain to technology issues. Bill remembers that last night he let his daughter use his telephone, and before doing so he logged out of his user account for the news website. Thus, Bill is viewing the "public" version of the news aggregation webpage and is not viewing stories that are generated based on preferences in his user account. Bill selects a link at the top portion of the news webpage that reads "Log In."

In response to selection of the link, Bill's telephone submits a request to load resources corresponding to the "Log In" link, and a respective authentication page is presented on the computing device. Bill enters his username and password credentials for the news aggregation webpage, and selects a "submit" button. The credentials are encrypted and submitted to the server system corresponding to the news aggregation webpage. The server system determines that the credentials are valid, and in response, transmits a cookie to Bill's telephone. The cookie is encrypted and includes information that indicates that Bill is authenticated for the user account at the news webpage.

The server system issues a redirect to Bill's telephone. The redirect specifies a URL that corresponds to the personalized version of the news aggregation webpage. In response to receiving the redirect, Bill's telephone submits a request over the internet for resources that correspond to URL of the personalized version of the news aggregation webpage. The computing device also transmits the cookie to the server system (either with the request or in response to a successive request for authentication cookies by the news aggregation webpage server system). The server system for the news aggregation webpage decrypts the cookie and determines that Bill is indeed authenticated to access the personalized version of the website. Thus, the news aggregation webpage server system transmits resources for rendering the personalized version of the webpage to Bill's mobile telephone.

Bill's mobile telephone receives the resources, stores the resources in the cache, and renders a personalized version of the news aggregation webpage for presentation. Bill is pleased because the personalized version of the webpage includes many more articles about technology and more articles that pertain to Bill's hometown, per his user settings and viewing history.

The next day, Bill wakes up early, packs his bags, and sets off to go backpacking with his friends. After only a few hours of backpacking, Bill is out of the range of cell towers and his telephone is not able to connect to the internet. Bill, however, wants to read some of the recent news articles and he launches the web browser application program on his telephone. Because Bill's telephone has cached the personalized and non-personalized versions of the news webpage, Bill may still be able to render the news aggregation webpage and view summaries of the articles. In this example, the cache also includes the content of the news articles as the news aggregation server system provided the text content for each of the news articles to the mobile telephone. The resources stored for each version of the webpage include instructions that, when executed by the web browser, ensure that the correct version of the news webpage is presented. FIG. 1 illustrates a request by Bill to access a cached version of the news webpage.

FIG. 1 is a conceptual diagram illustrating the launching of a cached web application based on an authentication status. This illustration continues the above discussion of Bill's use of a mobile telephone 102. In this illustration, Bill's mobile telephone 102 does not have access to the internet, but Bill selects a "bookmark" for a news webpage, and the telephone 102 submits a request 106 to the cache 104 (which is stored locally on Bill's mobile telephone). The request 106 includes a URL 108 that corresponds to an unauthenticated version of the news webpage.

In response to the request, the cache 104 retrieves resources 110 that correspond to the unauthenticated URL 108, and the resources 110 are provided to a web browser. The retrieved resources include script code 110a that includes instructions for determining the authentication status of computing device. The web browser executes the script code, determines that Bill is authenticated based on the presence of a cookie, and issues a redirect to a URL that corresponds to an authenticated version of the webpage.

In more detail, Bill selects a "bookmark" to view the news aggregation webpage. The bookmark, however, was saved when Bill was viewing the "public" news webpage (e.g., www.example.com/app?view=news&unauth=1) that is displayed when a user is not authenticated for the webpage. Thus, the web browser issues a request 106 to load resources that correspond to the unauthenticated URL. In some examples, the unauthenticated version of the news aggregation webpage corresponds to a different URL than the authenticated version of the news webpage. For example, the unauthenticated URL 108 may have an additional query parameter. In various examples, the authenticated URL 118 may have an additional query parameter. Also, the URLs may have different paths (i.e., the portions of the URL before the query parameters).

The cache 104 receives the request 106 to load resources that correspond to the unauthenticated URL 108. The request 106 includes the unauthenticated URL 108, and the cache 104 uses the unauthenticated URL 108 as a key to retrieve a set of resources 110 that are stored in association with the unauthenticated URL 108. The cache 104 provides the resources 110 to the web browser, which executes the resources. For example, the set of resources may include an HTML page and a set of dependent resources (e.g., graphics, style sheets, and JavaScript files). The web browser may begin to parse the HTML file, which may reference executable script code in the JavaScript file, causing the web browser to execute the JavaScript instructions.

The JavaScript code 110a may include instructions for checking whether the mobile telephone 102 is unauthenticated or authenticated. Thus, in this example, when the JavaScript instructions are executed, the web browser determines that the mobile telephone 102 is presently authenticated (see box 112). The determination may be performed by identifying that the mobile telephone 102 is currently storing a cookie for the domain of the unauthenticated URL (arrow 128), where the stored cookie indicates that the mobile telephone 102 is authenticated to view the personalized version of the news webpage. The unauthenticated URL and the authenticated URL may have a same domain, and a single cookie may indicate whether or not a computer storing the cookie is authenticated for the domain or a portion thereof.

Because the mobile computing device may not be connected to the internet, the telephone may be unable to send the cookie to a server system in order for the cookie to be decrypted and verified as a valid indication of user authentication. Thus, the mobile telephone 102 may check for the presence of a cookie that indicates that the mobile computing device is authenticated, without decrypting the cookie. In this example, cookies are stored in a repository 106, and are assigned to different domains.

For example, there is a cookie 114 for the example.com domain and a cookie 116 for the other.com domain. In various examples, the web browser may be configured so that execution of resources that correspond to a domain for a particular URL may only access cookies for the domain of the particular URL. Thus, a thread executing the script code 110a may not be able to access cookies for the other.com domain. In this example, the web browser determines that cookie 114 indicates that the mobile telephone 102 is currently authenticated to view personalized webpages for the example.com domain.

In response to determining that the mobile telephone 102 is authenticated 112, the instructions in the script 110a indicate that a redirect to a personalized version of the news aggregation webpage (e.g., a webpage corresponding to the authenticated URL 118) should be issued (see box 122). In some examples, the authenticated URL 118 is pre-coded into the script. In some examples, the authenticated URL 118 is partially coded into the script, and a portion of the URL (e.g., a query parameter) is determined based on the user that has been identified as being authenticated. For example, the cookie may include a non-encrypted user identifier. The non-encrypted user identifier may be inserted as a parameter in a URL to form the authenticated URL 118. Thus, the cache 104 may potentially store personalized versions of a webpage for multiple user accounts, each stored webpage corresponding to a different authenticated URL 118 and a different set of resources 120.

The web browser may receive the redirect request 124, and in response, may issue a request that the cache 104 return resources 120 that correspond to the authenticated URL 118. The cache returns the resources 120 (arrow 126), and execution of the script code 110a terminates, for example, so that a non-personalized version of the webpage is not presented to Bill for display and user interaction.

The web browser in the mobile telephone 102 may execute the script code 120a, which includes instructions to determine that the mobile device 102 is indeed authenticated to access the personalized version of the news aggregation webpage. In this example, the web browser determines that the cookie 114 properly indicates that the mobile telephone 102 is authenticated to access the personalized version of the news aggregation webpage. Thus, execution of the script code 120a continues and a personalized version of the news website is displayed to Bill on the screen of the mobile telephone 102.

Thus, Bill is able to view the personalized version of the news aggregation webpage. The personalized version may have appeared in response to a request for content that corresponds to the non-personalized webpage, and without displaying the non-personalized news aggregation webpage. All of these operations may occur without Bill's mobile telephone being connected to the internet (although the cached versions of the webpage may have been initially downloaded from the internet).

In another illustration, Bill visited both the personalized and non-personalized versions of the news aggregation webpage while at his house and while his device was connected to the internet, but he bookmarked the URL for the personalized authenticated version (instead of the non-personalized unauthenticated version). Bill then logged off the website, causing his mobile telephone 102 to delete the cookie 114 that indicated that he was authenticated to view the personalized website.

Later, while hiking and out of the range of cell towers, Bill selects the bookmark for the authenticated URL. Bill's mobile telephone 102 fetches resources 120 for the authenticated URL 118 from the cache 104 and executes the resources. The instructions in script 120a are executed, the mobile device 102 is determined to not be authenticated for the URL 118 (e.g., because the cookie 114 has been deleted), and a redirect is issued to the unauthenticated URL 108. Thus, resources corresponding to the unauthenticated URL 108 are fetched from the cache 104. The instructions in the script 110a determine that the mobile telephone 102 is indeed unauthenticated, and the unauthenticated version of the news aggregation webpage is presented for display.

Figure 2:
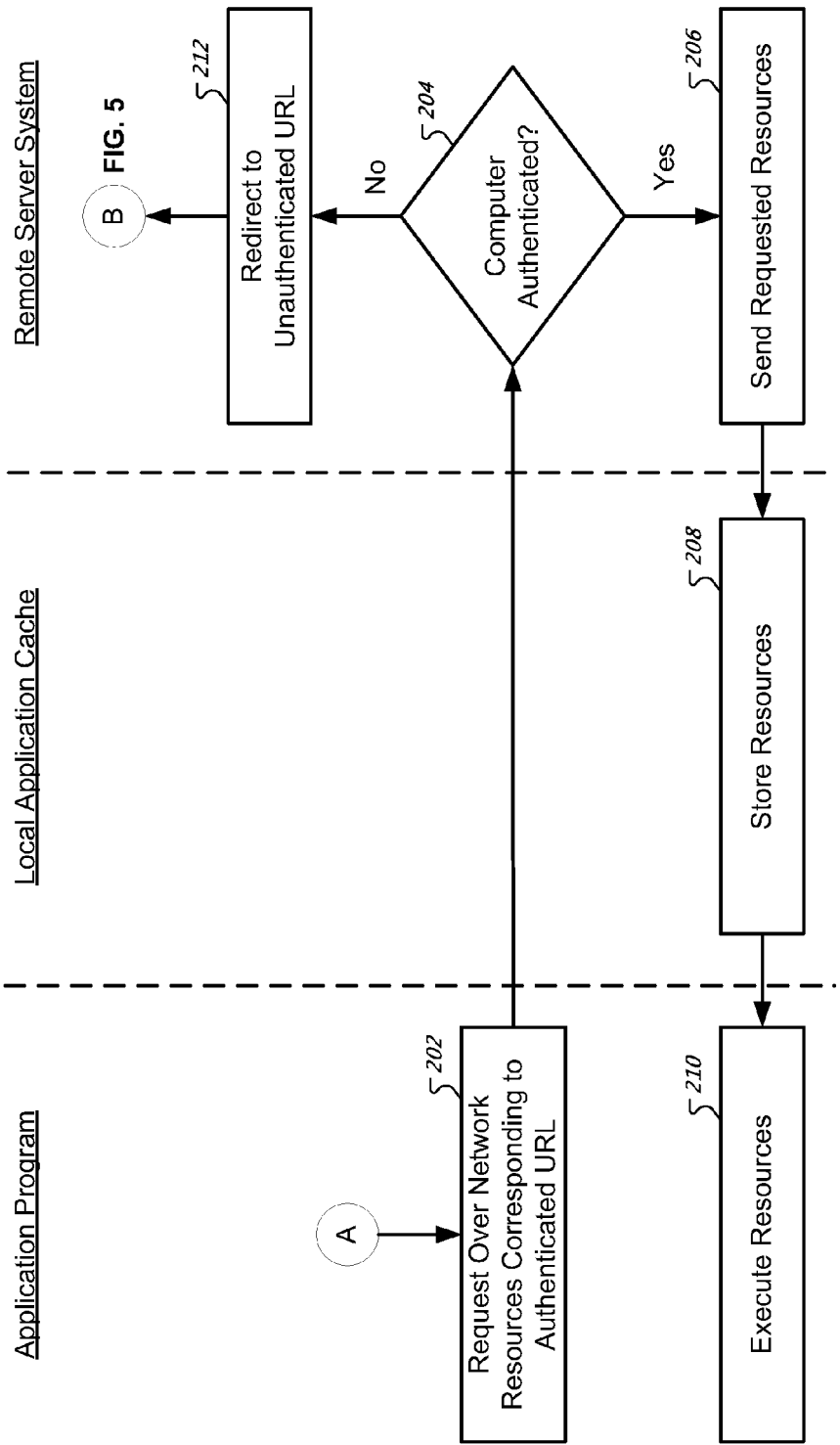
FIG. 2 is a swim lane diagram illustrating a request for authenticated resources from a remote datastore.
Figure 3:
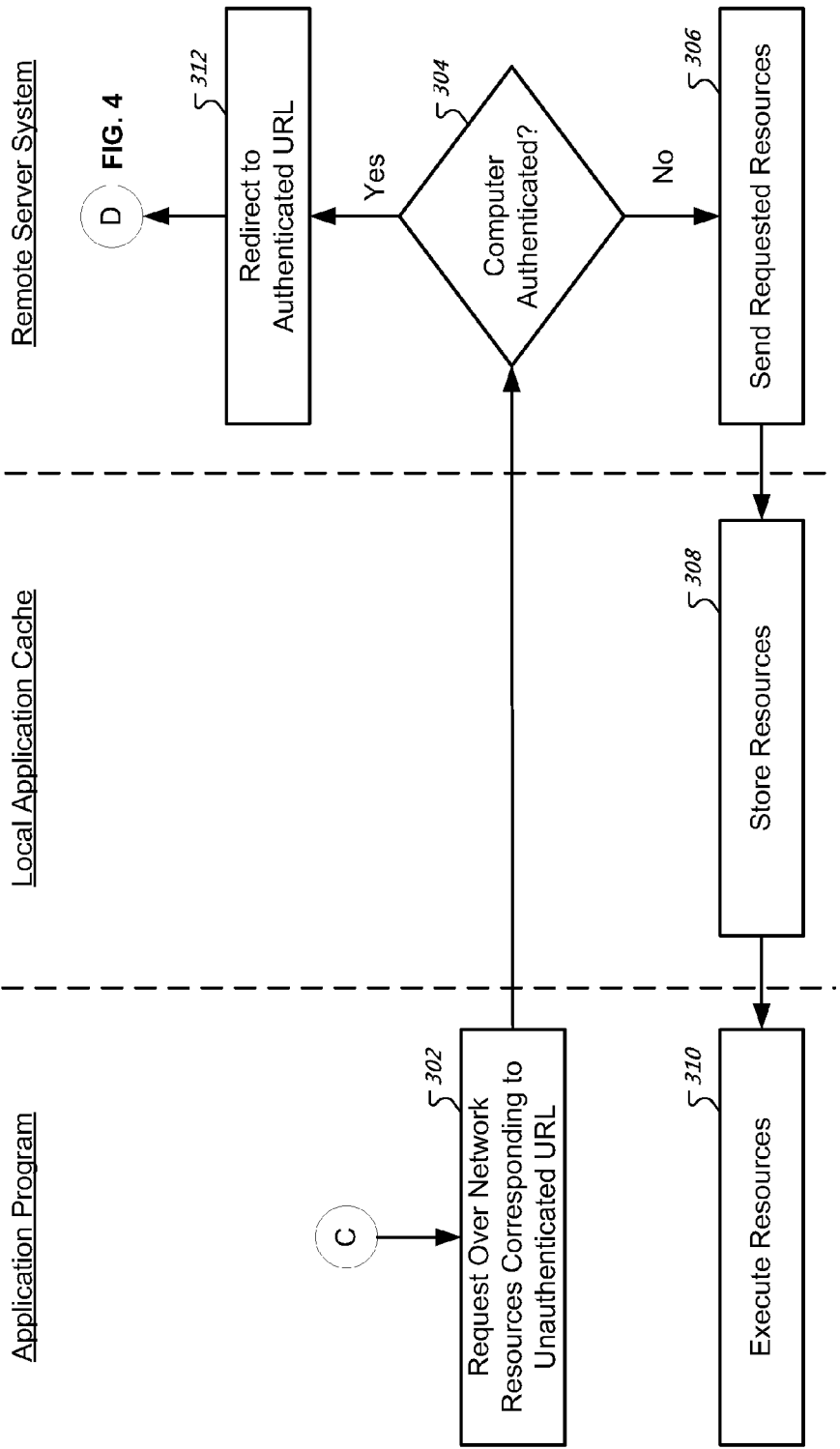
FIG. 3 is a swim lane diagram illustrating a request for unauthenticated resources from a remote datastore.
Figure 4:
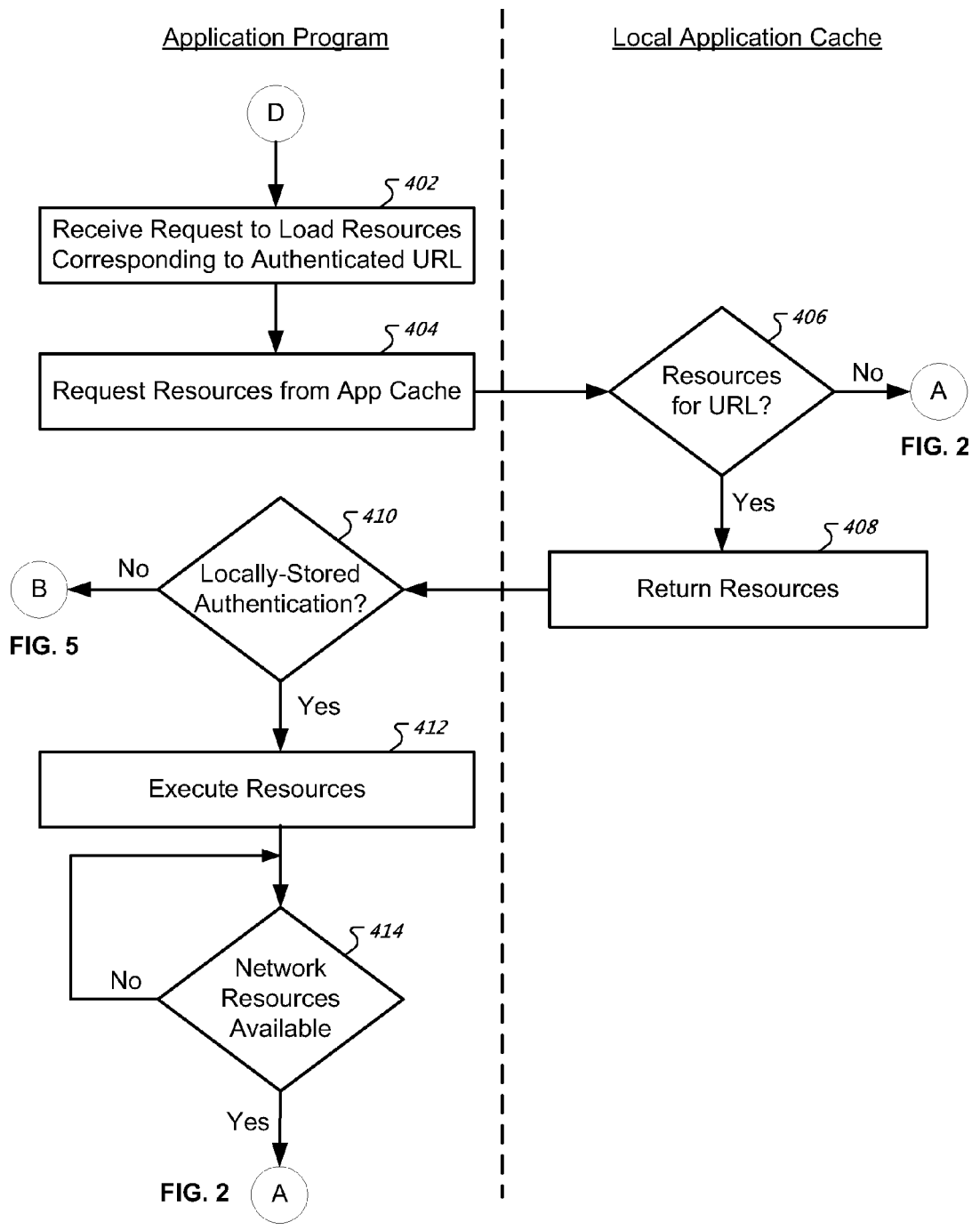
FIG. 4 is a swim lane diagram illustrating a request for authenticated resources from a local cache.

FIGS. 2-4 are swim lane diagrams that illustrate processes for retrieving resources for unauthenticated and authenticated versions of a web page from both a remote datastore (e.g., a server system accessible over the internet) and a cache stored on a local computing device.

FIG. 2 is a swim lane diagram illustrating a request for authenticated resources from a remote server system. In box 202, an application program requests over a network resources corresponding to an authenticated URL (e.g., a URL that corresponds to resources that require authentication to view the corresponding web application). The request is transmitted from the computing device 102 that is hosting the application program over a network to a remote server system (e.g., a server system that corresponds to a DNS address that is resolved for the authenticated URL). For example, a web browser issues a request over the internet to load a webpage for the authenticated URL.

In box 204, a determination is made regarding whether or not the computing device 102 is authenticated to receive the resources that correspond to the authenticated URL. For example, the server system may request from the computing device 102 cookies for the domain of the authenticated URL. Any cookies received at the server system and from the computing device 102 may be decrypted to determine if the computing device is indeed authenticated to view resources for the authenticated URL. For example, a username and password in the cookie may be checked against a database of usernames and passwords of individuals that are authorized to receive resources for the authenticated URL.

In some examples, determining if a computing device 102 is authenticated includes requesting the user of the computing device to enter a username and password, and determining by the server system if the username and password correspond to a valid user account that is authorized to receive resources for the authenticated URL. If so, a cookie is generated by the server system and transmitted to the computing device 102 for storage, so that the user need not repeatedly enter his username and password.

If the computing device is authenticated to receive the resources, the remote server system sends the requested resources to the computing device 102 (box 206). The computing device 102 receives the resources and stores the resources in the local application cache at the computing device (box 208). The resources that are stored in the cache may include the resources specified in a cache manifest (see FIGS. 6A-6B and corresponding discussion). The application program (e.g., a web browser) also executes the resources (box 210). Executing the resources can include parsing a dominant HTML file in the resources, and loading other dependent resources that are specified in the HTML file. In some examples, the resources are stored in the local application cache 208, and thereafter are loaded from the cache and executed 210. In some examples, the resources are executed from a memory bank, and thereafter are stored in the local application cache 208.

If the computing device is not authenticated to receive the resources, a redirect to the unauthenticated URL is issued (box 212). For example, an HTML redirect or JavaScript redirect may be implemented. As an illustration, the server system may transmit a redirect request to the computing device 102. The mobile computing device may then request resources corresponding to the URL specified in the redirect request. In various examples, the redirect request is transmitted directly to a server system corresponding to a different URL, and the server system for the different URL transmits a set of corresponding resources to the computing device. The request for resources corresponding to the unauthenticated URL is discussed in relation to FIG. 5.

FIG. 3 is a swim lane diagram illustrating a request for unauthenticated resources from a remote server system. In box 302, an application program requests, over a network, resources that correspond to an unauthenticated URL (e.g., a URL that corresponds to resources that do not require authentication to view the corresponding web application). The remote server system receives the request and determines if the computer is authenticated (box 304). If the user is not authenticated, resources corresponding to the unauthenticated URL are sent to the computing device 102 (box 306). The resources are stored in the local application cache (box 308), and the resources are executed by the application program (310). If the computing device is determined to be authenticated, a redirect to the authenticated URL is issued (box 312). The request for resources that correspond to the authenticated URL is discussed in relation to FIG. 4.

FIG. 4 is a swim lane diagram illustrating a request for authenticated resources from a local cache. In box 402, a request is received to load resources corresponding to an authenticated URL. For example, a user may type into a web browser address bar a URL that corresponds to an authenticated version of a webpage, or may select a bookmark that links to the same URL. Similarly, the user may have used one of the above-referenced methods to visited a splash webpage for a website (e.g., www.top-news-articles.com), and in response, the web browser may have received a redirect request to load resources that correspond to a URL for an authenticated version of the webpage (e.g., www.top-news-articles.com/personalized).

In box 404, the application program issues a request to the application cache for resources that correspond to the authenticated URL. In this example, the application program first queries a cache (e.g., an HTML5 application cache) to determine if resources are locally available before the application program queries a server system over a network.

In box 406, a determination of whether the local application cache includes resources that correspond to the authenticated URL is performed. For example, the authenticated URL may be used as a key to fetch resources that are stored for the key in a database.

If the local application cache does not include resources for the URL, a request is issued over a network for resources that correspond to the authenticated URL (see FIG. 2).

If the local application cache includes resources that correspond to the authenticated URL, the local application cache returns the resources to the application program (box 408).

The application program executes instructions that are contained within the cached resources (and thus were previously downloaded over a network from a server system that corresponds to the URL). The execution of the instructions prompts the application program to determine if the computing device includes information indicating that the computing device is authenticated to display a webpage that may be formed from the retrieved resources (box 410). For example, the application program may determine if a cookie is stored locally on the mobile computing device, where the cookie indicates that the mobile computing device is authenticated for the domain of the authenticated URL.

Figure 5:
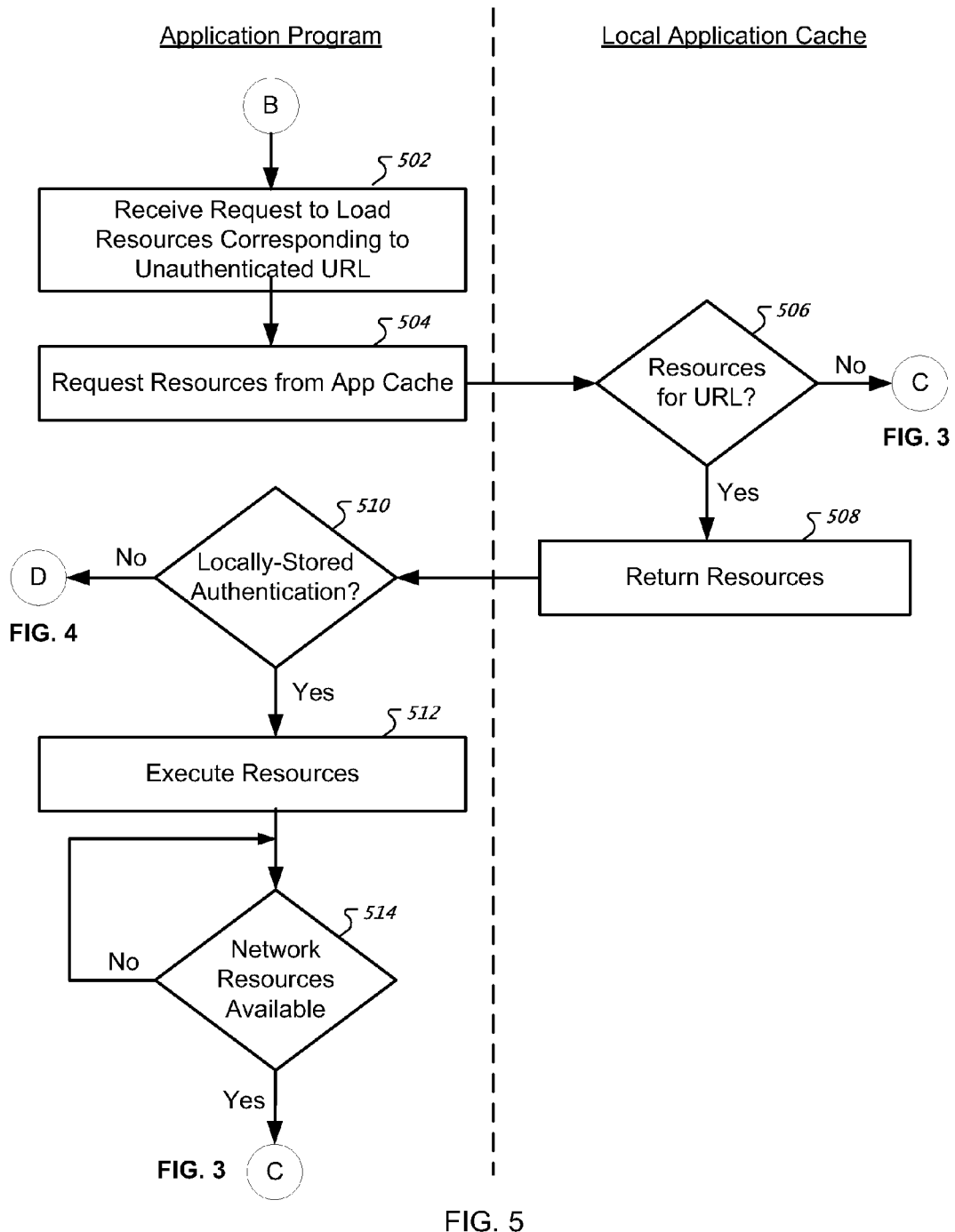
FIG. 5 is a swim lane diagram illustrating a request for unauthenticated resources from a local cache.

If the computing device is not authenticated, the application program requests resources that correspond to an unauthenticated URL (see FIG. 5).

If the computing device is authenticated, the application program continues to execute the resources in order to display the authenticated webpage to the user (box 412). While the application program may execute instructions in order to determine if the computing device is authenticated, the operations of box 412 may include a continued execution of these instructions that causes the application program (e.g., a web browser) to render the webpage for display to a user. The displayed webpage may be left in a state to receive user input for at least a determined amount of time (e.g., at least 1, 5, 10, or 30 seconds).

In box 414, a determination whether network resources are available is performed. For example, the personalized version of the webpage may be loaded quickly from the cache. The personalized version, however, may be out of date and thus a server system may be queried to determine if a newer version of the webpage is available.

If network resources are not available (e.g., because there is no network connection, or because there is a network connection but the server system that corresponds to the authenticated URL is not available), the computing device continues to request network resources. If network resources are available, the computing device may issue a request over a network for resources that correspond to the authenticated URL (see FIG. 2).

FIG. 5 is a swim lane diagram illustrating a request for unauthenticated resources from a local cache. In box 502, a request to load resources that correspond to an unauthenticated URL is received (e.g., a user may select a bookmark for the unauthenticated URL). In box 504, the application program requests the resources that correspond to the unauthenticated URL from the local application cache. In box 506, a determination is performed to determine whether there are resources in the cache for the unauthenticated URL. If not, a request over a network for resources corresponding to the authenticated URL is submitted (see FIG. 3).

If the cache does include resources that correspond to the unauthenticated URL, the resources are returned to the application program (box 508). Instructions in the resources are executed, causing a determination to be performed to identify whether or not the computing device is authenticated to access a webpage formed using the resources corresponding to the unauthenticated URL. If the computing device is authenticated, a redirect to request resources that correspond to the authenticated URL is issued (see FIG. 4). If the computing device is not authenticated, the application program generates a display of the webpage using the returned resources (box 512). If network resources are determined to be available (box 514), a request over a network for resources that correspond to an unauthenticated URL is submitted (see FIG. 3).

Figure 6A:
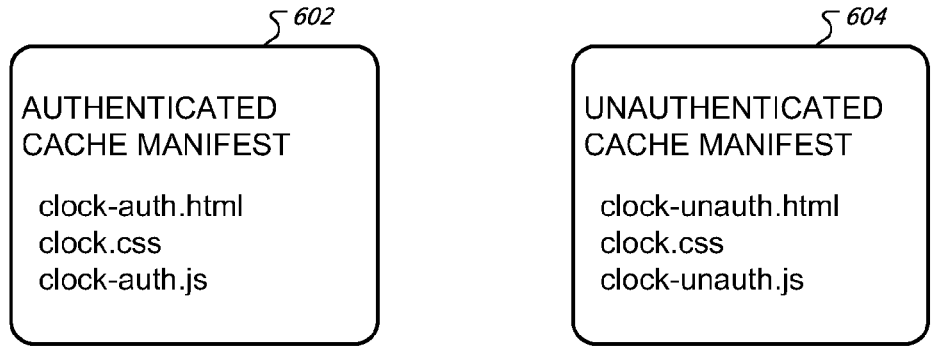
FIG. 6A is an example of a cache manifest for an authenticated webpage and a cache manifest for an unauthenticated webpage.

FIG. 6A is an example of a cache manifest for an authenticated webpage and a cache manifest for an unauthenticated webpage. A cache manifest is a file, which may be implemented in HTML 5, that allows authors of webpages to list the files that enable the webpage to function—or partially function—offline. The cache manifest is transmitted with the web page resources and instructs a web browser which of the resources to cache locally. For example, a simple clock applet may consist of an HTML page "clock.html", a CSS style sheet "clock.css," and a JavaScript script "clock.js." The three files may appear as follows.

```
<!-- clock.html -->
<!DOCTYPE HTML>
<html>
  <html manifest="clock.manifest">
    <head>
      <title>Clock</title>
      <script src="clock.js"></script>
      <link rel="stylesheet" href="clock.css">
    </head>
    <body>
      <p>The time is: <output id="clock"></output></p>
    </body>
</html>
  /* clock.css */
output { font: 2em sans-serif; }
  /* clock.js */
setTimeout(function ( ) {
  document.getElementById('clock').value = new Date( );
  }, 1000);
  CACHE MANIFEST
  clock.html
  clock.css
  clock.js
```

In this example, the HTML file includes the string "<html manifest="clock.manifest">," which causes the clock.manifest file (served as text/cache-manifest) to be linked to the clock web application. If a user requests resources for the clock web application, the web browser retrieves the resources and caches the files that are specified in the cache manifest file. The files in the cache manifest may be cached and available even when the computing device is offline.

Referencing the cache manifests illustrated in FIG. 6A, cache manifest 602 is for an authenticated version of a web application, and cache manifest 604 is presented for an unauthenticated version of the web application. Each manifest file references different html files and different JavaScript files. For example, the display and operation of the authenticated clock web application may differ from the display and operation of the unauthenticated clock web application. Accordingly, each HTML file may include different HTML elements. Also, the JavaScript files may include different executable script instructions.

For example, the "clock-auth.js" file may include instructions for ensuring that a computing device rendering the clock-auth.html file is authenticated, and if not, redirecting the computing device to the unauthenticated clock web application. Conversely, the "clock-unauth.js" file may include instructions for ensuring that the computing device is unauthenticated, and if not, redirecting the user to the authenticated clock web application. The stylesheet "clock.css" may be the same between both authenticated and unauthenticated versions of the web application.

Figure 6B:
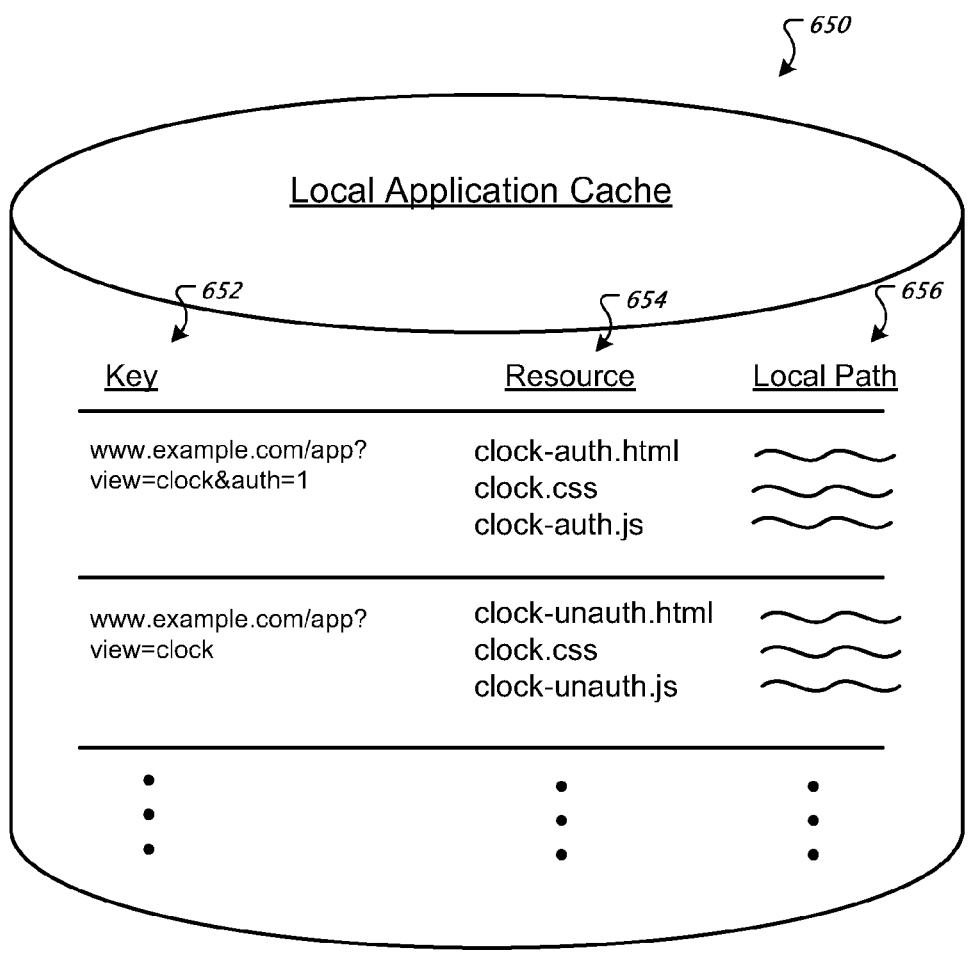
FIG. 6B conceptually illustrates a local application cache.

FIG. 6B conceptually illustrates a local application cache 650. The local application cache 650 is stored in computer readable memory on computing device 102. The cache 650 may include executable logic for retrieving data from a database, or for returning pointers to data that is stored in the database. The data or pointers may be returned to an application program that has requested a cached copy of resources (e.g., a web browser).

The cache 650 includes a set of resources for each of several keys 652. Each key may correspond to a network address (e.g., a URL), and the resources 654 that correspond to each key may be resources that were obtained in response to a request over a network for each respective address. For example, a computing device may request to load a webpage at the URL "www.example.com/clock." The computing device may be redirected to an unauthenticated version of the website at the "unauthenticated" URL "www.example.com/app?view=clock."

The resources for a clock application program may be transferred from a networked server system to the computing device 102, and a cache manifest may indicate which of the transferred resources are to be stored in the local cache 650 for the unauthenticated URL. The cache 650 may identify, for each stored resource, a local path 656 on the computing device for accessing each of the resources. Thus, the cache 650 may provide a web browser access to cached versions of data files for a web application until network coverage is restored. In some examples, each individual resource is keyed to a different URL. For example, the "clock-auth.html" file may be stored for the "www.example.com/app?view=clock&auth=1" URL, while the "clock.css" and the "clock-auth.js" files may be stored for different URLs.

FIG. 7 is a swim lane diagram illustrating a process for utilizing a local application cache in connection with a remote server system. In this illustration, the application program has received a request to obtain one or more resources corresponding to a URL. The application program 702 first attempts to obtain the resources from a local application cache 704 by issuing a "get" request 708 with the requested URL as the key. The local application cache 704 determines that there are no resources stored for the URL, and returns an indication 710 that there are no resources stored for the key.

The application program 702 next attempts to request the resources over a network from a remote server system 706 by issuing a get request 712 with the URL as the key. The remote server system 706 returns the corresponding resource 714. The application program 702 places the resource into the application cache with a "put" command 718 that includes the URL as the key and the resource or a pointer to the resource as the content to be stored in association with the key. At some later point in time, the application program 702 may request the resource from the local application cache 704 with a "get" request 718. In response, the local application cache 704 determines that a resource is stored for the URL key, and returns the resource 720.

Figure 8:
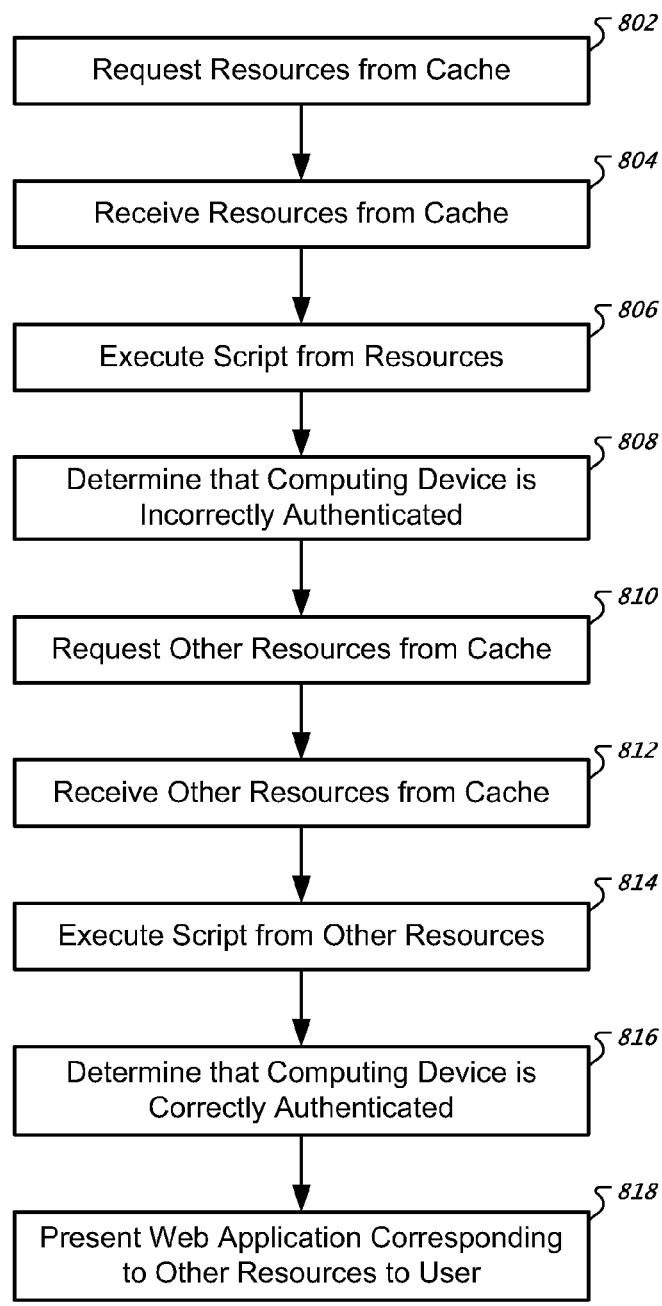
FIG. 8 is a flowchart of an example process for determining that a computing device does not have a correct authentication status and loading a set of resources.

FIG. 8 is a flowchart of an example process for determining that a computing device does not have a correct authentication status and loading a set of resources. In box 802, a request to obtain resources from a cache is provided. For example, a web browser may request resources that correspond to a URL from an application cache.

In box 804, the requested resources are received from the cache. For example, the web browser may receive a pointer to the resources that correspond to the URL. The received resources may have been loaded into the cache after a user visited a website on the internet. A cache manifest may have indicated that the resources should be stored in the cache for the URL.

In box 806, a script from the resources is executed. For example, JavaScript code in an HTML file or referenced within the HTML file, and that influences the behavior of the web browser is executed.

In box 808, the execution of the script causes an application program to determine that the computing device is incorrectly authenticated. For example, a web browser executing the script code may determine that a user is authenticated for a domain while trying to access resources that correspond to a non-authenticated web application for the domain. Conversely, the web browser may determine that the user is unauthenticated for the domain while trying to access resources that correspond to an authenticated web application for the domain. The determination of the authentication status may include checking the status or existence of a cookie for the domain, and may not include requests to a remote server system.

In box 810, the execution of the script causes the application program to request other resources from the cache in response to determining that the computing device is incorrectly authenticated. For example, in response to determining that the computing device is incorrectly authenticated, the script instructions may cause the web browser to redirect to retrieve resources for a different URL that is specified in the script.

In box 812, the other resources for the different URL are retrieved from the cache. For example, the web browser receives a pointer to the other resources or the resources are loaded into a memory bank.

In box 814, a script from the other resources is executed. For example, JavaScript code in an HTML file or referenced within the HTML file, and that influences the behavior of the web browser is executed.

In box 816, the execution of the script causes the application program to determine that the computing device is correctly authenticated. For example, the web browser may determine that a cookie is stored, where the cookie indicates that the user is authenticated for the domain of resources that correspond to a personalized version of a web application. Conversely, the web browser may determine that there is no cookie stored for a domain corresponding to a non-personalized version of the web page.

In box 818, the web application corresponding to the other resources is presented to the user. For example, a display of the web application formed from the other resources is presented for display to a user. The user may be able to interact with the web application and link to external websites through the web application.

Figure 9:
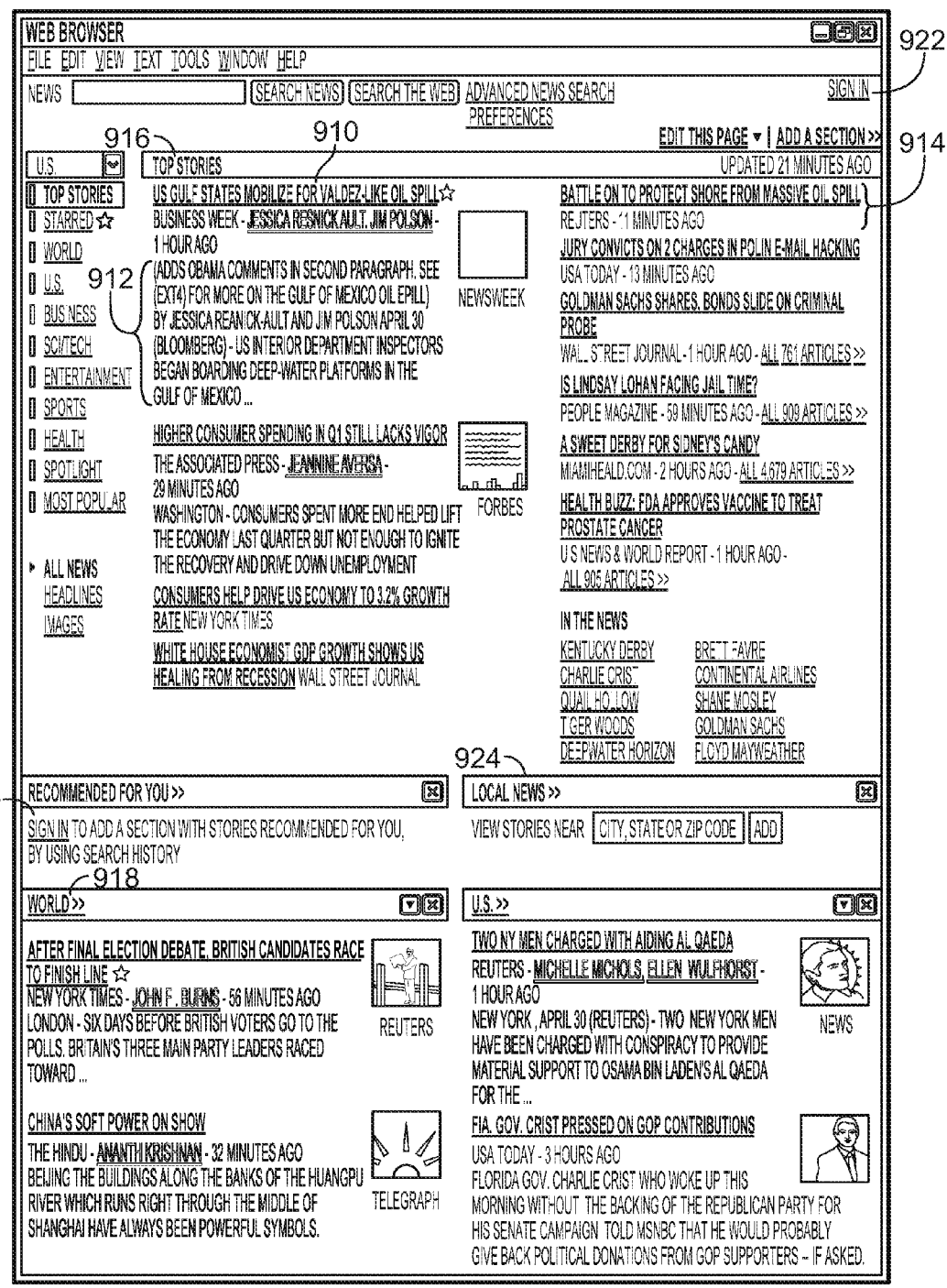
FIG. 9 is a screenshot of an example non-personalized version of a web application.

FIG. 9 is a screenshot of an example non-personalized version of a web application. The illustrated web application is the "news aggregation webpage" referenced with regard to the illustration involving Bill in FIG. 1. The illustrated news aggregation web application displays summaries for news articles from websites across the internet.

In particular, the server system for the news aggregation web application selects news articles that may be particularly relevant or interesting to an individual viewing the web application at a client computing device. Various metrics may be used to determine articles of interest, e.g., time of posting, content, user-traffic, links to the article, and user-interactions with the article within the news web application.

Some of the particularly relevant news articles may be listed with a title (e.g., title 910) and a summary of content from the article (e.g., summary 912). Other articles may include only a title, publisher, and time of posting (e.g., article 914). Also, the articles may be grouped by topical category. For example, there are several articles listed under the "Top Stories" category 916 and several articles listed under the "World" category 918.

The illustrated web application is presented to a user that has not signed in to view the web application (e.g., the user is not currently authenticated for the domain of the web application). Thus, the illustrated content may be served to multiple non-authenticated individuals requesting content for the web application at a particular time. In some examples, the content that is served to an individual is personalized to include geographically relevant content based on IP address, but is not personalized for a particular user account. Thus, in this example where the user is non-authenticated, the user is able to "Sign In" using either of links 920 or 922. In response, a login screen that enables the user to provide credentials (e.g., a username and password) will be presented to the user. Also, the user may request that news articles appear under the "Local News" section 924 by entering a location.

Figure 10:
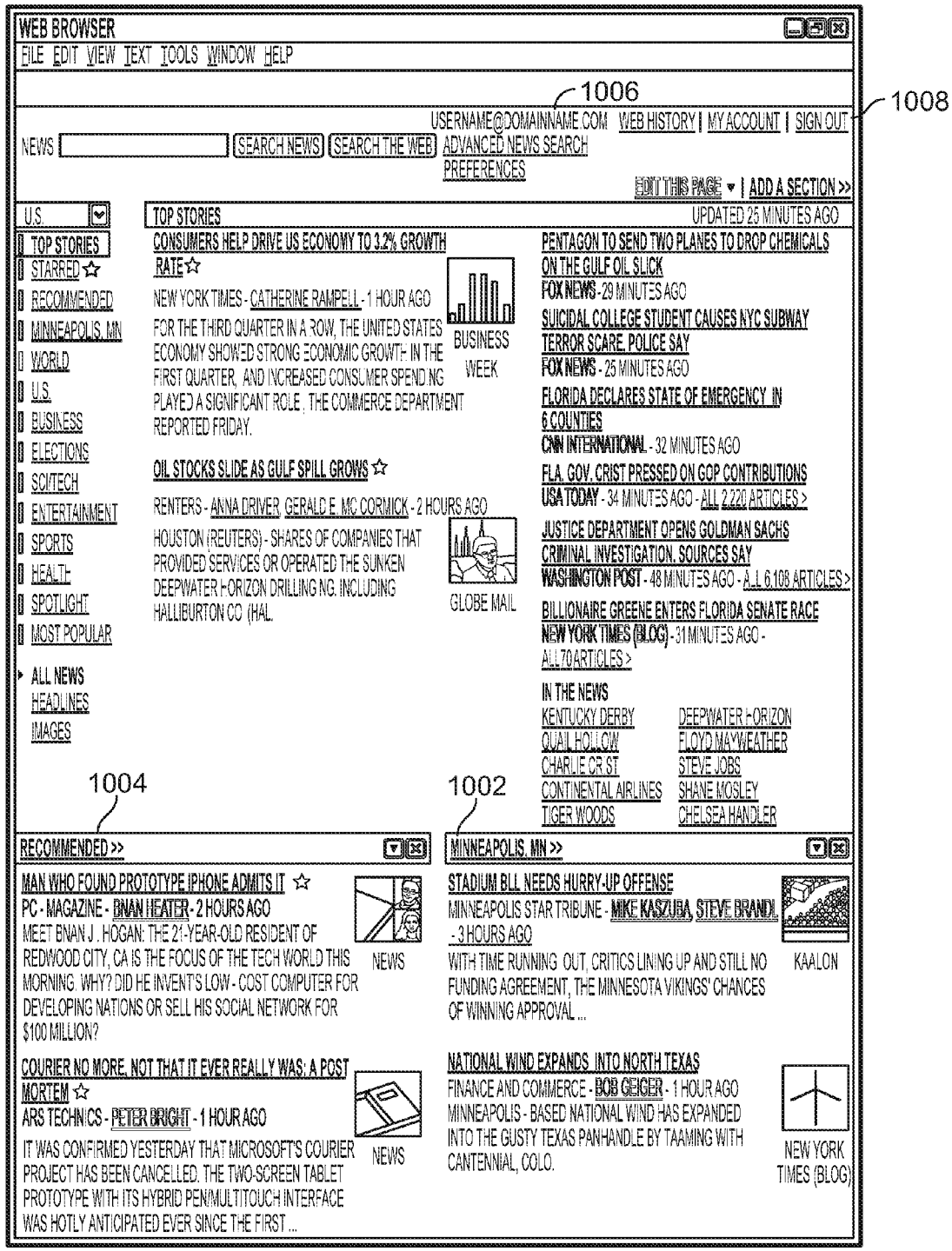
FIG. 10 is a screenshot of an example personalized version of a web application.

FIG. 10 is a screenshot of an example personalized version of a web application. In this example, a user viewing the news aggregation web application is authenticated and viewing a personalized version of the web application of FIG. 9. For example, the user may have selected either of the "sign in" links 920 or 922, or may have signed in at an earlier date and selected a bookmark link for a URL that was directed to either the non-personalized version of the web application or the personalized version of the web application (as discussed earlier in this document, attempting to view the non-personalized version of the web application when authenticated may result in the user being redirected to the personalized version of the web application).

The user account 1006 for the logged in user is presented at the top of web browser display. The user can log out by selecting the "sign out" link 1008. In response to selecting the sign out link 1008, the user may be redirected to the non-personalized version of the web application illustrated in FIG. 9. Further, the server system may request that a cookie that indicates that the user is authenticated for the news application be removed from the user's computing device 102.

In this example, different news articles are displayed than in the non-personalized version of the web application illustrated in FIG. 9. The ordering and selection of news articles may be different than in the non-personalized version of the web application due to a stored history of the logged-in user's selection of news articles, and user-selected and stored user preferences. Also, the "Local News" category 924 has been replaced by a "Minneapolis, Minn." category 1002. Further, articles are now "Recommended" 1004 for the particular logged in user.

Figure 11:
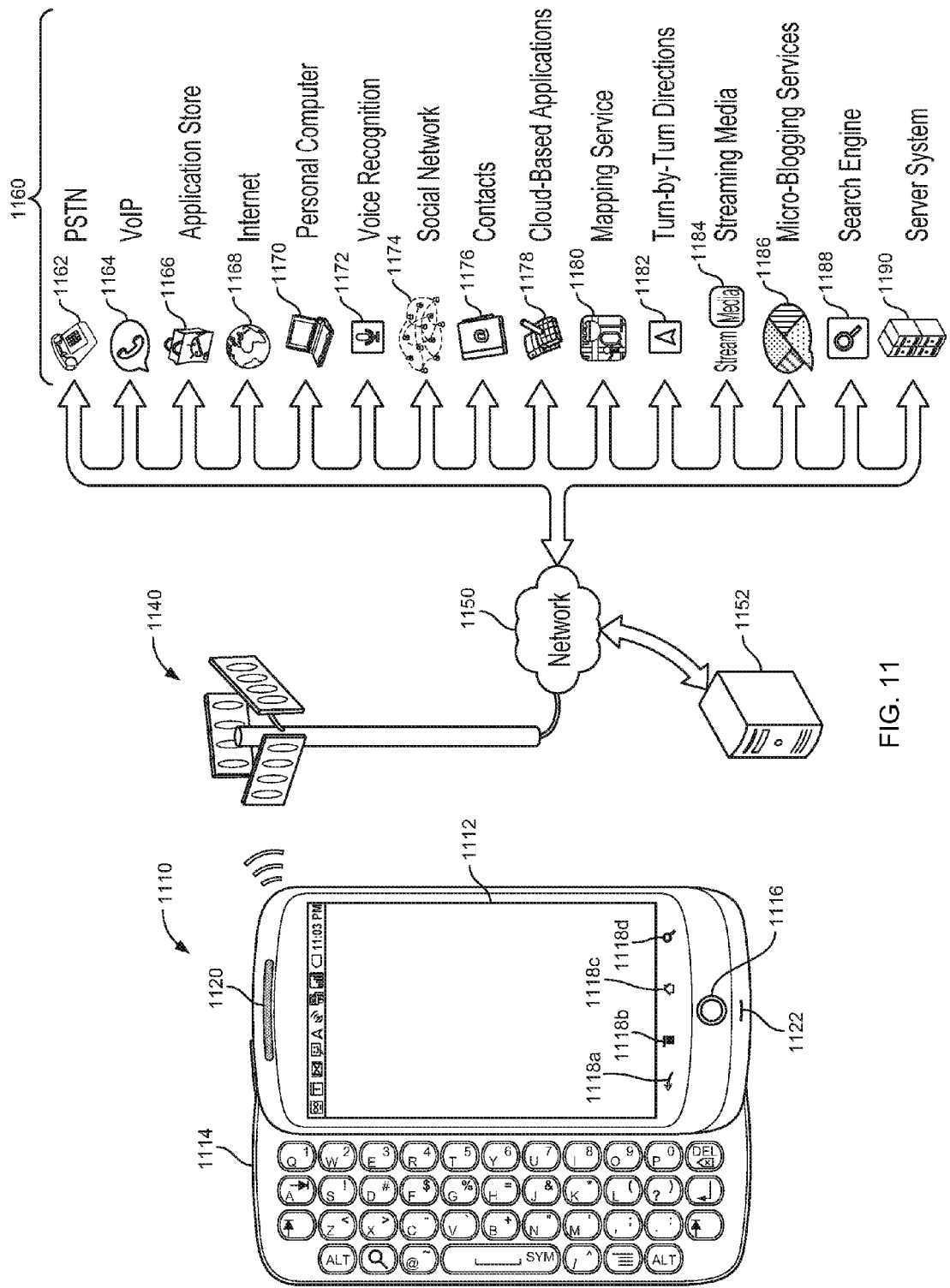
FIG. 11 is a conceptual diagram of a system that may be used to implement the systems and methods described in this document.

Referring now to FIG. 11, a conceptual diagram of a system that may be used to implement the systems and methods described in this document is illustrated. In the system, mobile computing device 1110 can wirelessly communicate with base station 1140, which can provide the mobile computing device wireless access to numerous hosted services 1160 through a network 1150.

In this illustration, the mobile computing device 1110 is depicted as a handheld mobile telephone (e.g., a smartphone, or application telephone) that includes a touchscreen display device 1112 for presenting content to a user of the mobile computing device 1110 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 1114, physical buttons, trackballs, accelerometers, gyroscopes, and magnetometers).

Example visual output mechanism in the form of display device 1112 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 1110. The mobile computing device 1110 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 1114, which may be a full qwerty keyboard or a traditional keypad that includes keys for the digits '0-9', '#', and The keyboard 1114 receives input when a user physically contacts or depresses a keyboard key. User manipulation of a trackball 1116 or interaction with a trackpad enables the user to supply directional and rate of rotation information to the mobile computing device 1110 (e.g., to manipulate a position of a cursor on the display device 1112).

The mobile computing device 1110 may be able to determine a position of physical contact with the touchscreen display device 1112 (e.g., a position of contact by a finger or a stylus). Using the touchscreen 1112, various "virtual" input mechanisms may be produced, where a user interacts with a graphical user interface element depicted on the touchscreen 1112 by contacting the graphical user interface element. An example of a "virtual" input mechanism is a "software keyboard," where a keyboard is displayed on the touchscreen and a user selects keys by pressing a region of the touchscreen 1112 that corresponds to each key.

The mobile computing device 1110 may include mechanical or touch sensitive buttons 1118a-d. Additionally, the mobile computing device may include buttons for adjusting volume output by the one or more speakers 1120, and a button for turning the mobile computing device on or off. A microphone 1122 allows the mobile computing device 1110 to convert audible sounds into an electrical signal that may be digitally encoded and stored in computer-readable memory, or transmitted to another computing device. The mobile computing device 1110 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 1110 may present a graphical user interface with the touchscreen 1112. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1104. User-selection of the button may invoke the pre-defined action.

In some examples, the operating system provides a "desktop" user interface that is displayed upon turning on the mobile computing device 1110, activating the mobile computing device 1110 from a sleep state, upon "unlocking" the mobile computing device 1110, or upon receiving user-selection of the "home" button 1118*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 1110 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 1112 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 1110 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 1110 may include other application modules and hardware. A call handling unit may receive an indication of an incoming telephone call and provide a user capabilities to answer the incoming telephone call. A media player may allow a user to listen to music or play movies that are stored in local memory of the mobile computing device 1110. The mobile telephone 1110 may include a digital camera sensor, and corresponding image and video capture and editing software. An internet browser may enable the user to view content from a web page by typing in an addresses corresponding to the web page or selecting a link to the web page.

The mobile computing device 1110 may include an antenna to wirelessly communicate information with the base station 1140. The base station 1140 may be one of many base stations in a collection of base stations (e.g., a mobile telephone cellular network) that enables the mobile computing device 1110 to maintain communication with a network 1150 as the mobile computing device is geographically moved. The computing device 1110 may alternatively or additionally communicate with the network 1150 through a Wi-Fi router or a wired connection (e.g., Ethernet, USB, or FIREWIRE). The computing device 1110 may also wirelessly communicate with other computing devices using BLUETOOTH protocols, or may employ an ad-hoc wireless network.

A service provider that operates the network of base stations may connect the mobile computing device 1110 to the network 1150 to enable communication between the mobile computing device 1110 and other computerized devices that provide services 1160. Although the services 1160 may be provided over different networks (e.g., the service provider's internal network, the Public Switched Telephone Network, and the internet), network 1150 is illustrated as a single network. The service provider may operate a server system 1152 that routes information packets and voice data between the mobile computing device 1110 and computing devices associated with the services 1160.

The network 1150 may connect the mobile computing device 1110 to the Public Switched Telephone Network (PSTN) 1162 in order to establish voice or fax communication between the mobile computing device 1110 and another computing device. For example, the service provider server system 1152 may receive an indication from the PSTN 1162 of an incoming call for the mobile computing device 1110. Conversely, the mobile computing device 1110 may send a communication to the service provider server system 1152 initiating a telephone call with a telephone number that is associated with a device accessible through the PSTN 1162.

The network 1150 may connect the mobile computing device 1110 with a Voice over Internet Protocol (VoIP) service 1164 that routes voice communications over an IP network, as opposed to the PSTN. For example, a user of the mobile computing device 1110 may invoke a VoIP application and initiate a call using the program. The service provider server system 1152 may forward voice data from the call to a VoIP service, which may route the call over the internet to a corresponding computing device, potentially using the PSTN for a final leg of the connection.

An application store 1166 may provide a user of the mobile computing device 1110 the ability to browse a list of remotely stored application programs that the user may download over the network 1150 and install on the mobile computing device 1110. The application store 1166 may serve as a repository of applications developed by third-party application developers. An application program that is installed on the mobile computing device 1110 may be able to communicate over the network 1150 with server systems that are designated for the application program. For example, a VoIP application program may be downloaded from the Application Store 1166, enabling the user to communicate with the VoIP service 1164.

The mobile computing device 1110 may access content on the internet 1168 through network 1150. For example, a user of the mobile computing device 1110 may invoke a web browser application that requests data from remote computing devices that are accessible at designated universal resource locations. In various examples, some of the services 1160 are accessible over the internet.

The mobile computing device may communicate with a personal computer 1170. For example, the personal computer 1170 may be the home computer for a user of the mobile computing device 1110. Thus, the user may be able to stream media from his personal computer 1170. The user may also view the file structure of his personal computer 1170, and transmit selected documents between the computerized devices.

A voice recognition service 1172 may receive voice communication data recorded with the mobile computing device's microphone 1122, and translate the voice communication into corresponding textual data. In some examples, the translated text is provided to a search engine as a web query, and responsive search engine search results are transmitted to the mobile computing device 1110.

The mobile computing device 1110 may communicate with a social network 1174. The social network may include numerous members, some of which have agreed to be related as acquaintances. Application programs on the mobile computing device 1110 may access the social network 1174 to retrieve information based on the acquaintances of the user of the mobile computing device. For example, an "address book" application program may retrieve telephone numbers for the user's acquaintances. In various examples, content may be delivered to the mobile computing device 1110 based on social network distances from the user to other members. For example, advertisement and news article content may be selected for the user based on a level of interaction with such content by members that are "close" to the user (e.g., members that are "friends" or "friends of friends").

The mobile computing device 1110 may access a personal set of contacts 1176 through network 1150. Each contact may identify an individual and include information about that individual (e.g., a phone number, an email address, and a birthday). Because the set of contacts is hosted remotely to the mobile computing device 1110, the user may access and maintain the contacts 1176 across several devices as a common set of contacts.

The mobile computing device 1110 may access cloud-based application programs 1178. Cloud-computing provides application programs (e.g., a word processor or an email program) that are hosted remotely from the mobile computing device 1110, and may be accessed by the device 1110 using a web browser or a dedicated program. Example cloud-based application programs include GOOGLE DOCS word processor and spreadsheet service, GOOGLE GMAIL webmail service, and PICASA picture manager.

Mapping service 1180 can provide the mobile computing device 1110 with street maps, route planning information, and satellite images. An example mapping service is GOOGLE MAPS. The mapping service 1180 may also receive queries and return location-specific results. For example, the mobile computing device 1110 may send an estimated location of the mobile computing device and a user-entered query for "pizza places" to the mapping service 1180. The mapping service 1180 may return a street map with "markers" superimposed on the map that identify geographical locations of nearby "pizza places."

Turn-by-turn service 1182 may provide the mobile computing device 1110 with turn-by-turn directions to a user-supplied destination. For example, the turn-by-turn service 1182 may stream to device 1110 a street-level view of an estimated location of the device, along with data for providing audio commands and superimposing arrows that direct a user of the device 1110 to the destination.

Various forms of streaming media 1184 may be requested by the mobile computing device 1110. For example, computing device 1110 may request a stream for a pre-recorded video file, a live television program, or a live radio program. Example services that provide streaming media include YOUTUBE and PANDORA.

A micro-blogging service 1186 may receive from the mobile computing device 1110 a user-input post that does not identify recipients of the post. The micro-blogging service 1186 may disseminate the post to other members of the micro-blogging service 1186 that agreed to subscribe to the user.

A search engine 1188 may receive user-entered textual or verbal queries from the mobile computing device 1110, determine a set of internet-accessible documents that are responsive to the query, and provide to the device 1110 information to display a list of search results for the responsive documents. In examples where a verbal query is received, the voice recognition service 1172 may translate the received audio into a textual query that is sent to the search engine.

These and other services may be implemented in a server system 1190. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 12:
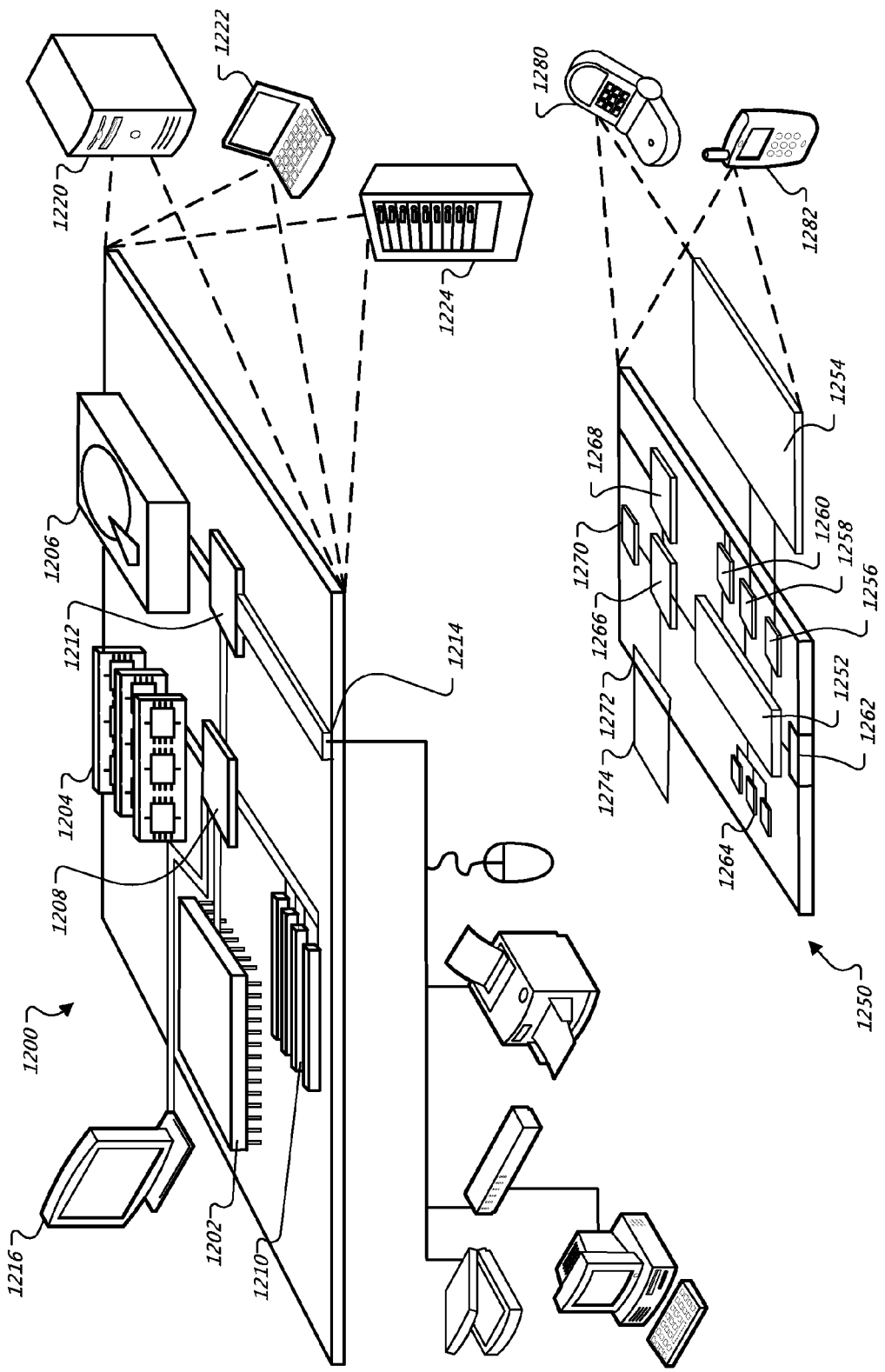
FIG. 12 is a block diagram of computing devices that may be used to implement the systems and methods described in this document, as either a client or as a server or plurality of servers.

FIG. 12 is a block diagram of computing devices 1200, 1250 that may be used to implement the systems and methods described in this document, as either a client or as a server or a plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. Additionally computing device 1200 or 1250 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252 that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, the method comprising:

receiving, by a web browser at a computing device, a first request to retrieve first resources that correspond to a first network address;

submitting, by the computing device and over a network, the first request to retrieve the first resources;

receiving, at the computing device and from a different computing device communicating over the network in response to the computing device having submitted the first request, the first resources, wherein the first resources are configured to activate a user interface of a first web application and activation of the user interface of the first web application requires that the computing device be currently authenticated;

executing, by the web browser at the computing device in response to having received the first resources over the network, instructions that are in the first resources and that are for activating the user interface of the first web application, wherein execution of the instructions includes determining whether the computing device is currently authenticated to activate the user interface of the first web application;

using, by the web browser at the computing device, the first resources to activate the user interface of the first web application, in response to having determined that the computing device is currently authenticated to activate the user interface of the first web application;

storing, in response to having received the first resources over the network, the first resources in a cache that is stored locally at the computing device;

receiving, by the web browser at the computing device and after the resources have been stored in the cache, a second request to retrieve the first resources;

submitting, by the web browser at the computing device, the second request to retrieve the first resources;

retrieving, by the web browser and from the cache in response to having submitted the second request, the first resources; and executing, by the web browser at the computing device in response to having retrieved the first resources from the cache, the instructions that are in the first resources and that are for activating the user interface of the first web application, wherein execution of the instructions includes:

determining whether the computing device is currently authenticated to activate the user interface of the first web application, and as a result of having determined that the computing device is not currently authenticated to activate the user interface of the first web application, requesting to retrieve second resources that correspond to a second network address and that are configured to activate a user interface of a second web application, wherein activation of the user interface of the second web application does not require that the computing device be currently authenticated.

2. The computer-implemented method of claim 1, wherein the first network address comprises a first uniform resource locator (URL) for accessing the first resources over the network, and the second network address comprises a second URL for accessing the second resources over the network.

3. The computer-implemented method of claim 2, further comprising receiving, at the computing device, user input that initiates the first request to retrieve the first resources, the user input either being user typing of the first URL or user selection of a link that is addressed to the first URL.

4. The computer-implemented method of claim 1, wherein the instructions that are in the first resources are described in a scripting language that can control execution of the web browser.

5. The computer-implemented method of claim 1, wherein requesting to retrieve the second resources includes issuing, by the computing device, a redirection request that is directed to the second network address.

6. The computer-implemented method of claim 5, further comprising:
receiving, by the computing device, the issued redirection request, and in response,
retrieving, by the computing device and from the cache, the second resources.

7. The computer-implemented method of claim 1, wherein during the submission of the second request, the computing device is not operationally connected to the network, so that the computing device is unable to communicate with remote computing devices over the network.

8. The computer-implemented method of claim 1, wherein during the submission of the second request, the computing device is not operationally connected to the network, so that the computing device is unable to receive, from over the network, the first resources and the second resources.

9. The computer-implemented method of claim 1, further comprising determining that the computing device is not currently authenticated to activate the user interface of the first web application by determining that the computing device does not have a locally-stored cookie that indicates that the computing device is currently authenticated to activate the user interface of the first web application.

10. The computer-implemented method of claim 1, wherein requesting to retrieve the second resources includes identifying the second network address within the instructions that are in the first resources.

11. The computer-implemented method of claim 1, wherein the second web application is an unauthenticated version of the first web application and is hosted by a same domain that hosts the first web application.

12. The computer-implemented method of claim 1, wherein the requesting to retrieve the second resources is performed in lieu of activating the user interface of the first web application for interacting with the user.

13. The computer-implemented method of claim 1, wherein the cache is a web browser application cache.

14. A computer-implemented method, the method comprising:
receiving, by a web browser at a computing device, a first request to retrieve first resources that correspond to a first network address;

submitting, by the computing device and over a network, the first request to retrieve the first resources;

receiving, at the computing device and from a different computing device communicating over the network in response to the computing device having submitted the first request, the first resources, wherein the first resources are configured to activate a user interface of a first web application and activation of the user interface of the first web application requires that the computing device be currently unauthenticated;

executing, by the web browser at the computing device in response to having received the first resources over the network, instructions that are in the first resources and that are for activating the user interface of the first web application, wherein execution of the instructions includes determining whether the computing device is currently unauthenticated;

using, by the web browser at the computing device, the first resources to activate the user interface of the first web application, in response to having determined that the computing device is currently unauthenticated;

storing, in response to having received the first resources over the network, the first resources in a cache that is stored locally at the computing device;

receiving, by the web browser at the computing device and after the resources have been stored in the cache, a second request to retrieve the first resources;

submitting, by the web browser at the computing device, the second request to retrieve the first resources;

retrieving, by the web browser and from the cache in response to having submitted the second request, the first resources; and executing, by the web browser at the computing device in response to having retrieved the first resources from the cache, the instructions that are in the first resources and that are for activating the user interface of the first web application, wherein execution of the instructions includes:

determining whether the computing device is currently unauthenticated, and as a result of having determined that the computing device is currently authenticated, requesting to retrieve second resources that correspond to a second network address and that are configured to activate a user interface of a second web application, wherein activation of the user interface of the second web application requires that the computing device be currently authenticated.

15. The computer-implemented method of claim 14, further comprising determining that the computing device is currently authenticated by determining that the computing device does have a locally-stored cookie that indicates that the computing device is currently authenticated to activate the user interface of the second web application.

16. The computer-implemented method of claim 14, further comprising:

retrieving, by the computing device and from the cache, the second resources; and executing, by the computing device, second instructions that are in the second resources, wherein execution of the second instructions includes:

determining whether the computing device is currently authenticated to activate the user interface of the first web application; and as a result of having determined that the computing device is currently authenticated to activate the user interface of the second web application, generating the user interface of the second web application.

17. The computer-implemented method of claim 16, further comprising receiving user input from user interaction with the user interface of the second web application.

* * * * *

UNITED STATES PATENT AND TRADEMARK OFFICE
CERTIFICATE OF CORRECTION

| | | |
|---|---|---|
| PATENT NO. | : 8,732,855 B2 | Page 1 of 1 |
| APPLICATION NO. | : 12/895182 | |
| DATED | : May 20, 2014 | |
| INVENTOR(S) | : Thomas et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this
Twenty-eighth Day of July, 2015

Michelle K. Lee
*Director of the United States Patent and Trademark Office*